W. K. RANKIN.
BRAKE VALVE.
APPLICATION FILED AUG. 15, 1908. RENEWED AUG. 25, 1909.
953,349.
Patented Mar. 29, 1910.
6 SHEETS—SHEET 1.
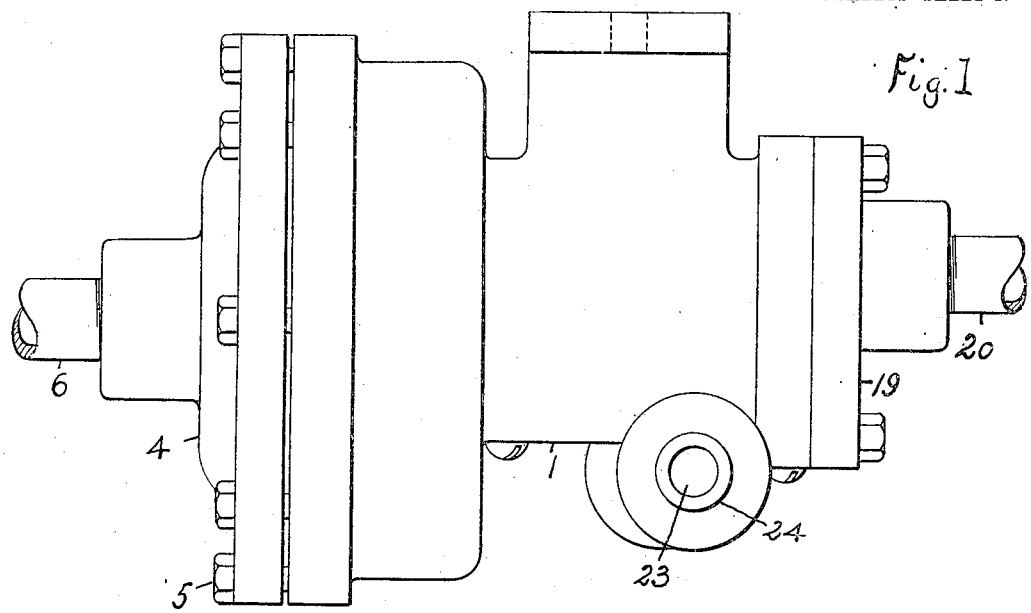
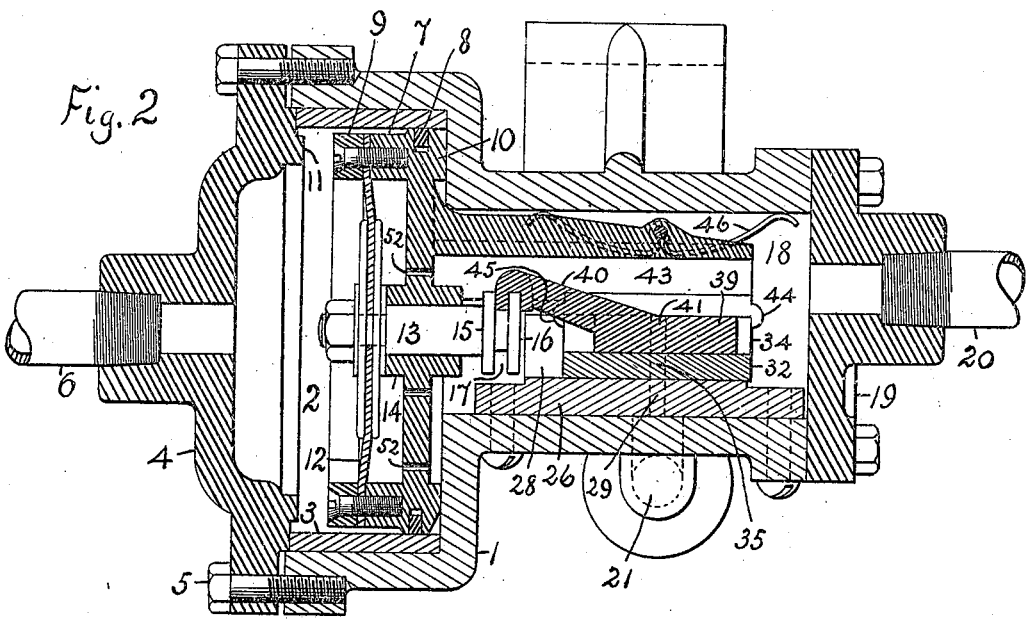
Witnesses.
Inventor.
Wm. K. Rankin.
By R. C. Wright
atty.

W. K. RANKIN.
BRAKE VALVE.
APPLICATION FILED AUG. 15, 1908. RENEWED AUG. 25, 1909.
953,349.
Patented Mar. 29, 1910.
6 SHEETS—SHEET 2.
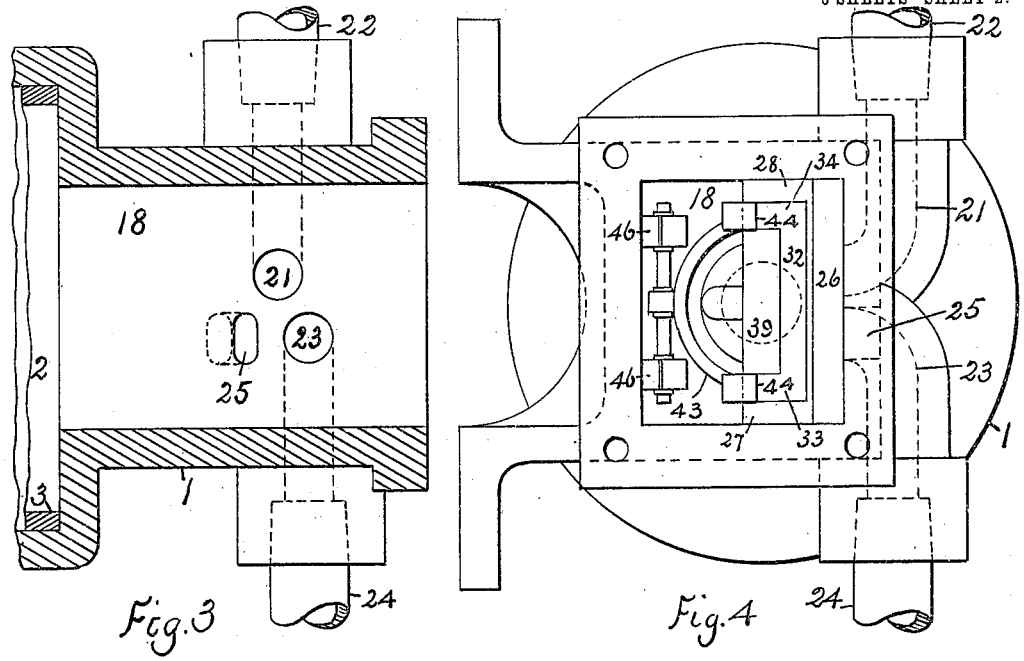
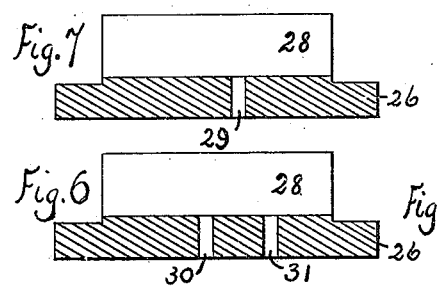
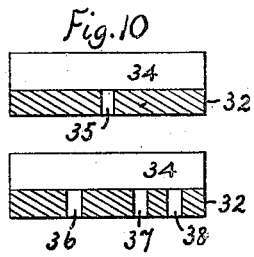
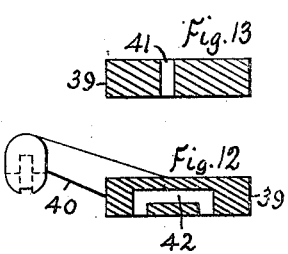
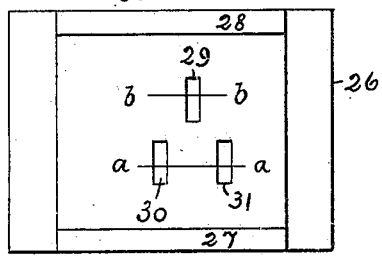
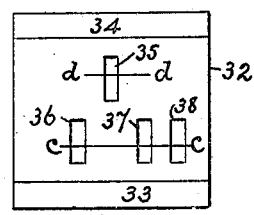
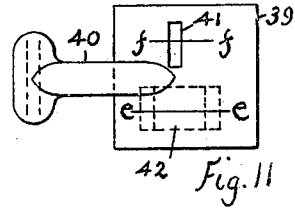
Witnesses.
Inventor
Wm. K. Rankin
By R C Wright
atty.

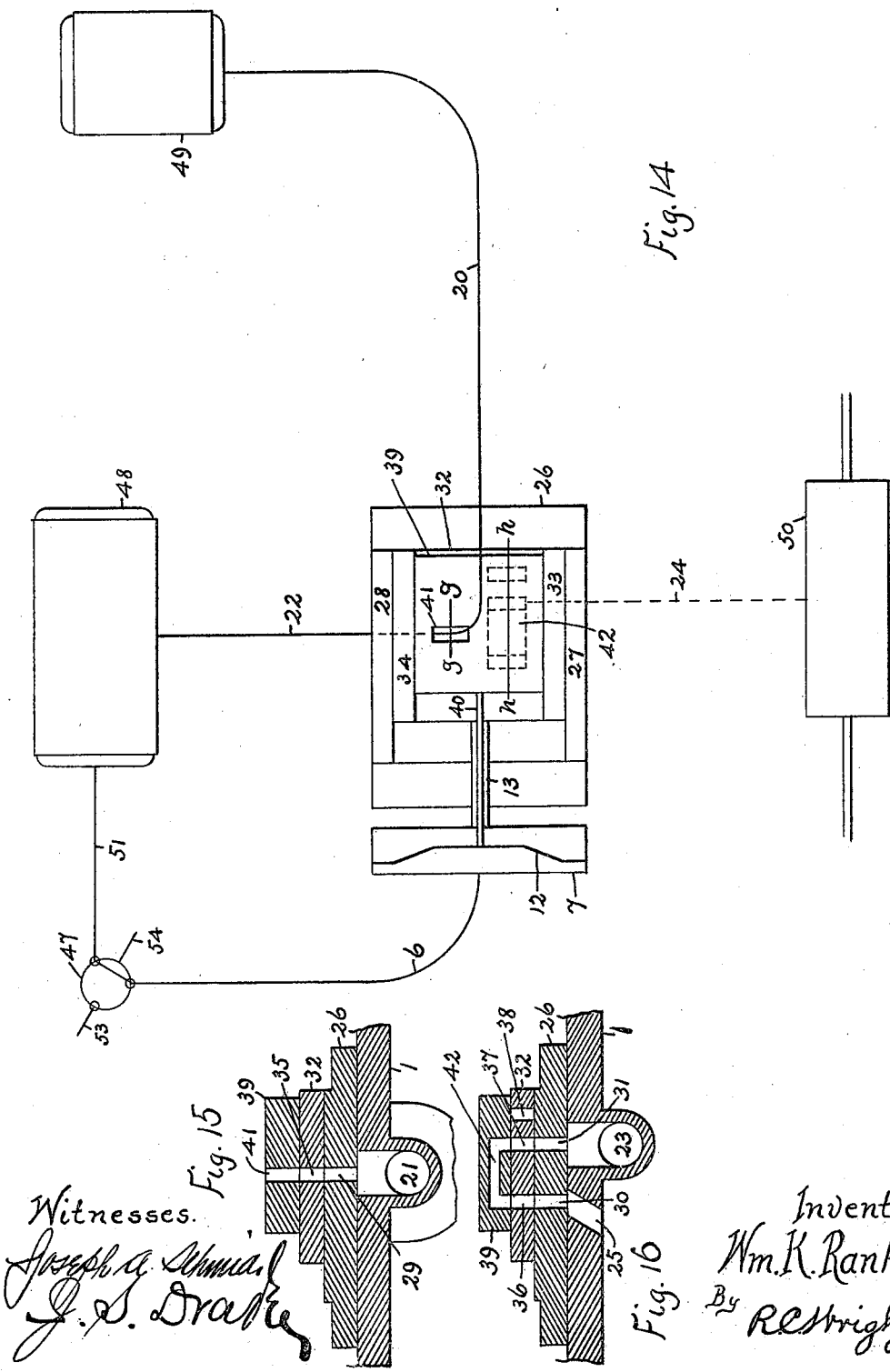

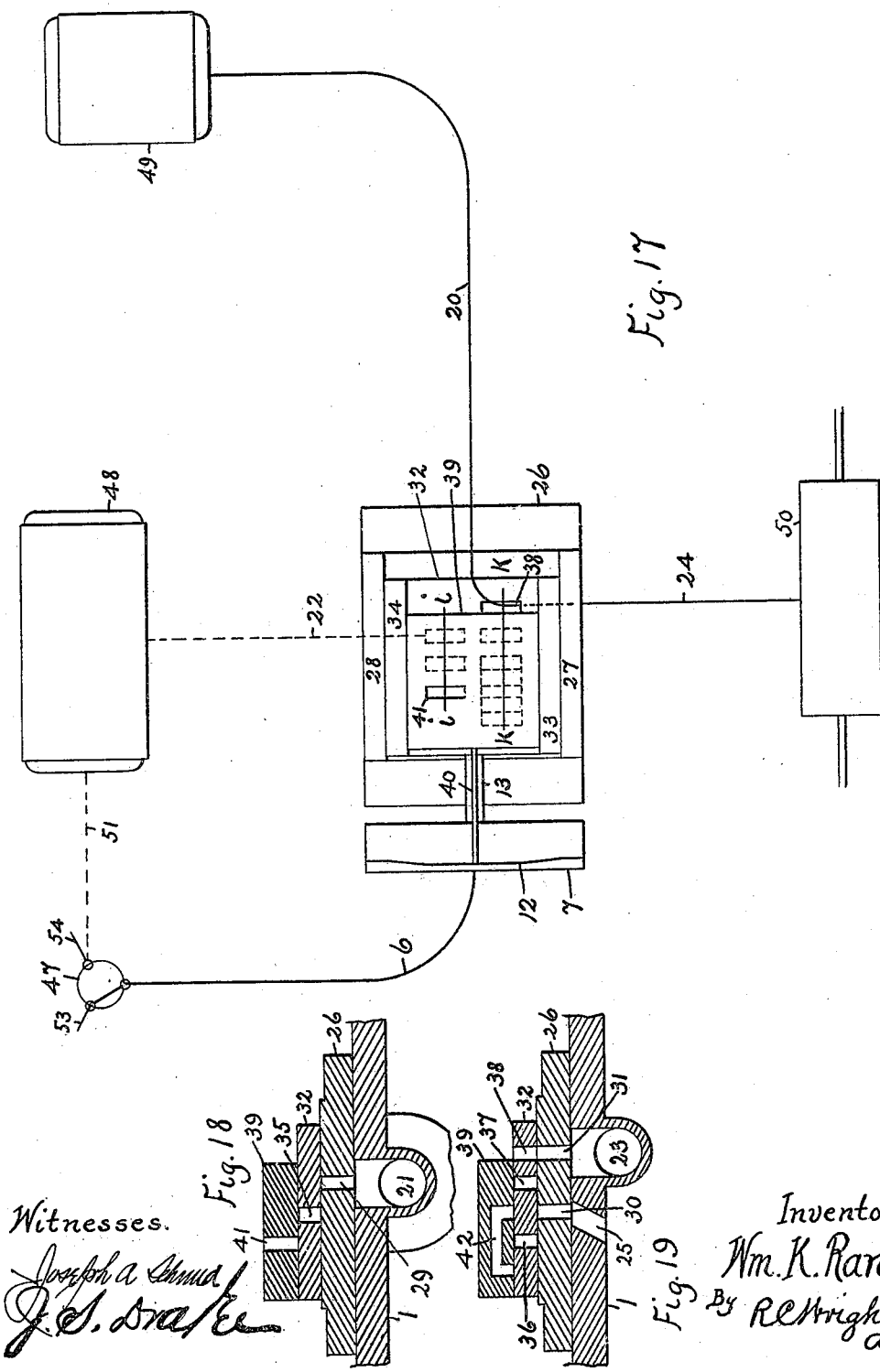

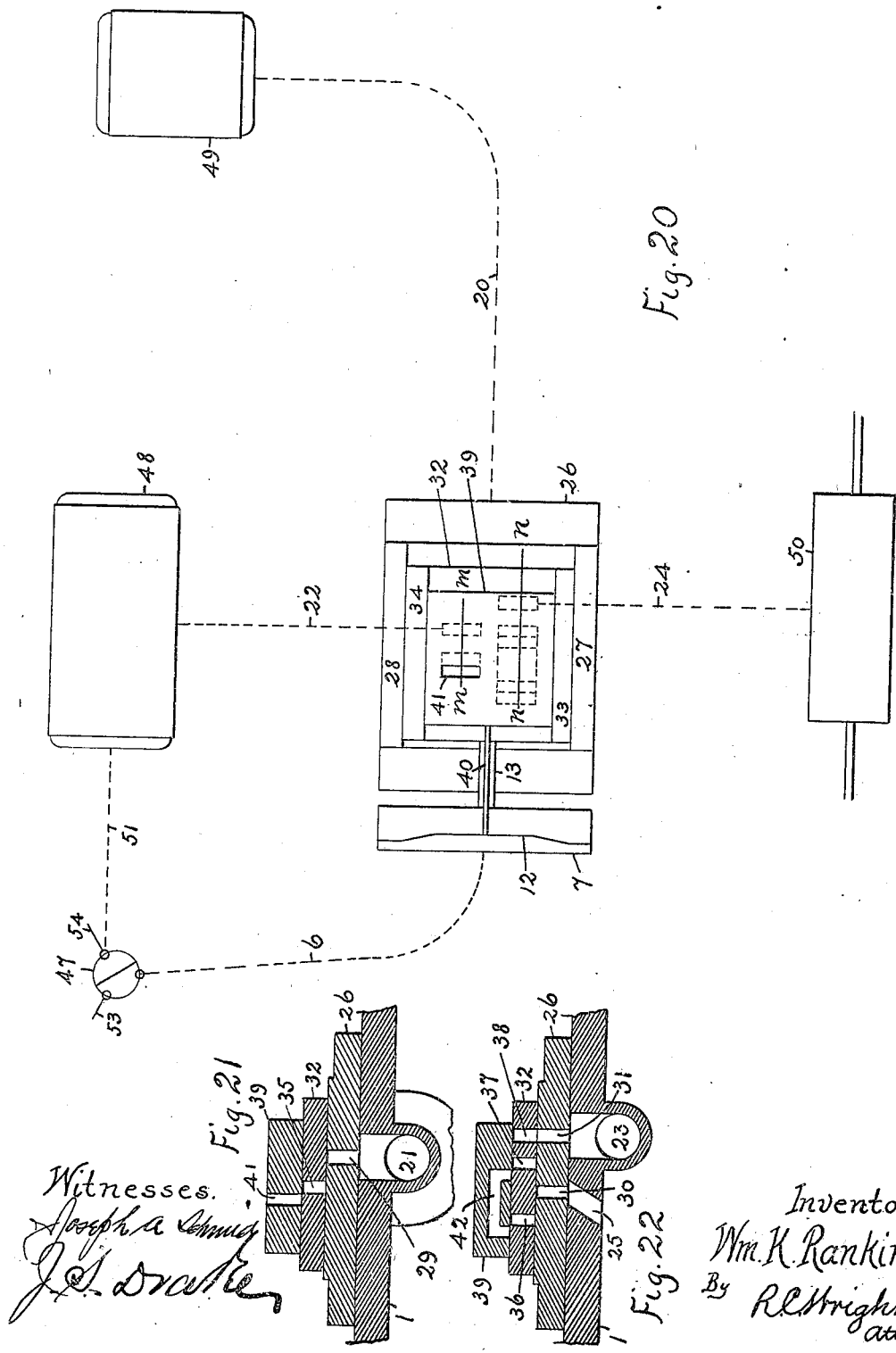

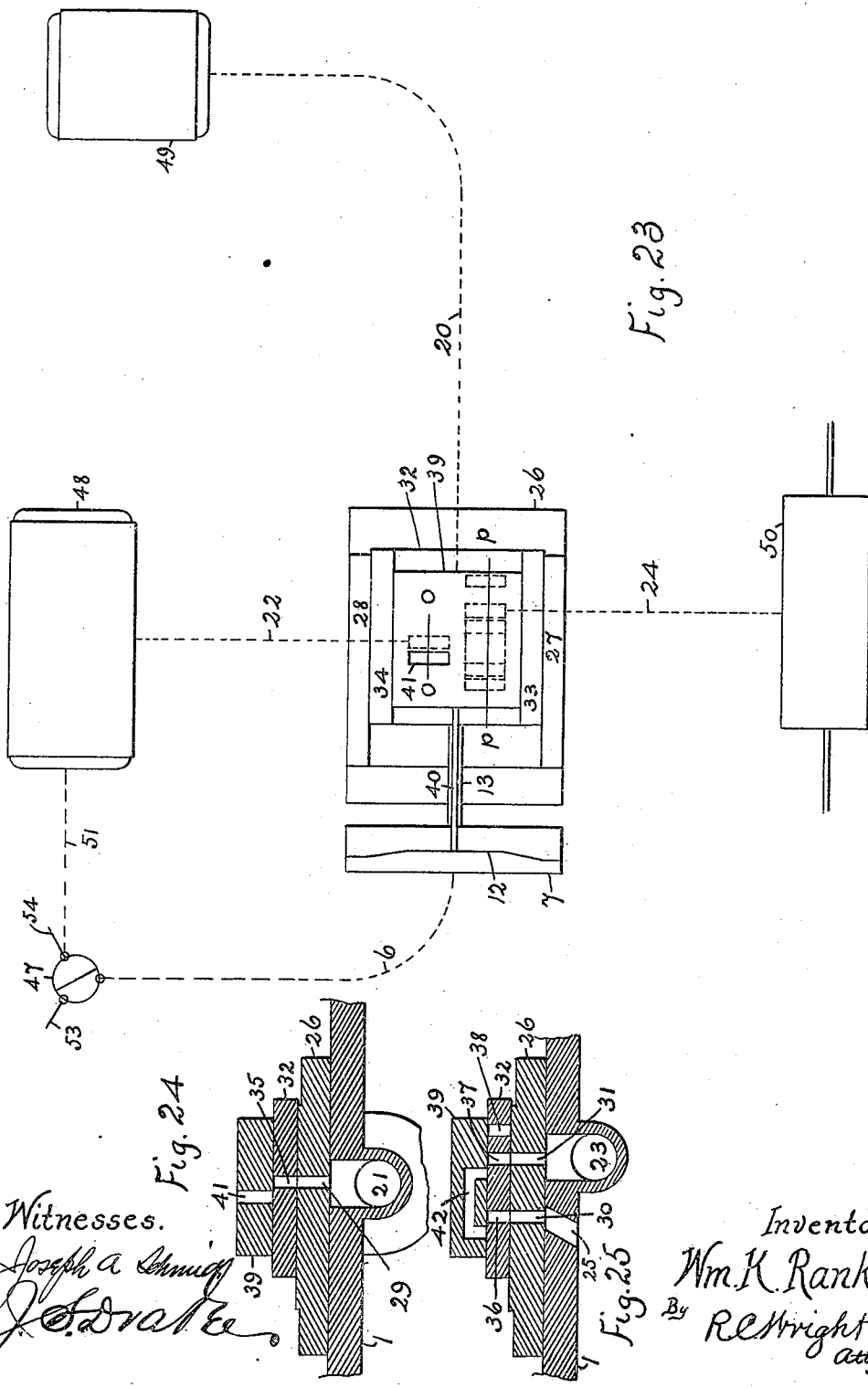

UNITED STATES PATENT OFFICE.

WILLIAM K. RANKIN, OF PHILADELPHIA, PENNSYLVANIA, ASSIGNOR TO JOHN E. REYBURN, OF PHILADELPHIA, PENNSYLVANIA.

BRAKE-VALVE.

953,349.  Specification of Letters Patent.  Patented Mar. 29, 1910.

Application filed August 15, 1908, Serial No. 448,694. Renewed August 25, 1909. Serial No. 514,604.

*To all whom it may concern:*

Be it known that I, WILLIAM K. RANKIN, a citizen of the United States, residing at Philadelphia, in the county of Philadelphia and State of Pennsylvania, have invented certain new and useful Improvements in Brake-Valves, of which the following is a specification.

The object of my invention is the construction of a valve automatic in action, with few and simple parts, with large wearing surfaces, and by the use of large ports insure speedy application, and a quick release. By the employment of a diaphragm which is very sensitive to changes in pressures, the graduated applications and releases are easy and immediately effective. Also, by the mechanism employed there is a simultaneous charging of the auxiliary reservoir at the time of the release of the brake cylinder.

Figure 1 is a side elevation. Fig. 2 is a longitudinal-central section. Fig. 3 is a longitudinal-central section of the valve chamber. Fig. 4 is an end view of the valve chamber. Fig. 5 is a plan of the valve seat and guide. Fig. 6 is a section on line *a a*, Fig. 5. Fig. 7 is a section on line *b b* Fig. 5. Fig. 8 is a plan of the piston controlled valve. Fig. 9 is a section on line *c c* Fig. 8. Fig. 10 is a section on line *d d* Fig. 8. Fig. 11 is a plan of the diaphragm controlled valve. Fig. 12 is a section on line *e e* Fig. 11. Fig. 13 is a section on line *f f* Fig. 11. Fig. 14 is a diagram of the parts in a position for a full release. Fig. 15 is a section on line *g g*. Fig. 16 is a section on line *h h*. Fig. 17 is a diagram of the parts in a position for an emergency application. Fig. 18 is a section on line *i i*. Fig. 19 is a section on line *k k*. Fig. 20 is a diagram of the parts in position for total inaction before a graduated application. Fig. 21 is a section on line *m m*. Fig. 22 is a section on line *n n*. Fig. 23 is a diagram of the parts in a total inaction before a position for a graduated release. Fig. 24 is a section on line *o o*. Fig. 25 is a section on line *p p*.

In a case 1 there is formed a circular piston chamber 2 having a bushing 3, a cover 4, bolts 5 and a train pipe 6 adapted to communicate with the engineer's valve. In chamber 2 there is a piston 7 with packing 8 and a follower 9. The movement of the piston is limited by an annular ring 10 which abuts case 1, and oppositely by an annular ring 11 on cover 4. Within the piston there is secured a diaphragm 12, having a central stem 13, passing through a hub 14 of the piston, and having collars 15, 16 separated by a groove 17. The diaphragm is limited in movement by abutting hub 14, and in the opposite direction by collar 15 abutting the hub 14. Case 1 also contains a valve chamber 18 of rectangular formation, with a cover 19 and a pipe 20 adapted to communicate with an auxiliary reservoir. The valve chamber also has a passage 21 with a pipe 22 adapted to communicate with a main reservoir, and a passage 23, with a pipe 24 adapted to communicate with a brake cylinder, and a passage 25 opening to the atmosphere. Within chamber 18 there is secured a seat 26 having guiding flanges 27, 28, a port 29 communicating with a main reservoir, a port 30 communicating with the atmosphere and a port 31 communicating with a brake cylinder. Mounted above seat 26 and guided thereon is a piston controlled valve 32 with guiding flanges 33, 34 and ports 35, 36, 37, 38. Mounted above valve 32 and guided thereon is a diaphragm controlled valve 39 having a connection 40 to stem 13 and having ports 41, 42. Piston 7 has an arched projection 43 with lugs 44, 45 which grasp the ends of flanges 33, 34 of valve 32 for its movement by piston 7. Springs 46 are mounted on projection 43 and bear against the top of chamber 18. In the diagrams the engineer's valve is 47, the main reservoir is 48, the auxiliary reservoir is 49, and the brake cylinder is 50. Train pipe 6 and connections 20, 22, 24, 51 when shown in full lines are operative and when shown in broken lines are inoperative. The movement of the diaphragm is more sensitive than the piston, owing to the piston being subject to greater friction. The piston is perforated as at 52 for the admission of pressure from the valve chamber to the diaphragm.

53 represents the outlet from the engineer's valve 47 to the atmosphere and 54 the handle to the engineer's valve.

In diagram 14 the parts are in such positions that maximum pressure has been stored in the main reservoir 48, and the train pipe 6, and the passage opened through engineer's valve 47 to piston 7 and diaphragm 12 to move valves 32, 39 and open communication from pipe 22 to passage 21, through ports 29, 35, 41 as seen in Figs. 15, 16 and through chamber 18 and pipe 20 to auxiliary reservoir 49; the piston 7 and diaphragm 12 being then in normal balanced position, with equal pressure at each side.

A graduated application is shown in diagrams 17, 20, where after the main reservoir 48 and the auxiliary reservoir 49 having been previously fully charged a moderate reduction of pressure in the train pipe 6 by the manipulation of the engineer's valve 47 will move the piston 7, diaphragm 12 and their valves 32, 39 to assume the positions shown in the diagram, closing passage 21, ports 29, 35, 41, and opening passage 23, ports 31, 38 for a free passage from auxiliary cylinder 49 through pipe 20, chamber 18 and pipe 24 to brake cylinder 50. As this flow reduces the pressure in valve chamber 18 until it is less than in the train pipe it causes the diaphragm 12 to move and its valve 37 to cover ports 31, 38 as seen in diagram 20, there being no movement of piston 7 and its valve 32 owing to the greater friction upon the piston than upon the diaphragm. Then by operating engineer's valve 47, and causing a slight reduction in pipe 6 which will move diaphragm 12 and its valve 39 as in diagram 17 opening ports 31, 38 and permitting the flow of pressure from auxiliary reservoir 49 to brake cylinder 50 which will produce a slight reduction in valve chamber 18, causing the diaphragm 12 and its valve 39 to assume the positions seen in diagram 20 and Figs. 21, 22, closing ports 31, 38. By continued manipulations as above producing slight reductions in the train pipe 6 pressure will finally be equalized between the auxiliary reservoir 49 and the brake cylinder 50. Assume the brake being applied by the equalization of the pressure between auxiliary reservoir 49 and brake cylinder 50 as seen in diagram 17 and Figs. 18, 19; then, a graduated release being desired, the valve 47 will be moved to connect reservoir 48 and train pipe 6 allowing pressure to force piston 7, diaphragm 12 and their valves 26, 32 to the positions seen in Figs. 14, 15, 16, then valve 47 connecting train pipe 6 and reservoir pipe 51, will force piston 7 and diaphragm 12 to positions shown in diagram 26, when the pressure will flow from brake cylinder 50 through pipe 24, passage 23, ports 31, 37, 42, 36, 30 to the atmosphere, also from reservoir 48 through pipe 22, passage 21, ports 29, 35, 41 to valve chamber 18 and pipe 20 to and charging auxiliary cylinder 49, the valve 47 then being put on lap position as in Fig. 23. The pressure in the valve chamber 18 will increase and force diaphragm 12 and its valves 39 to the positions shown in Figs. 23, 24, 25, cutting off the flow of air pressure from main reservoir 48 through passage 21, ports 29, 35, 41, chamber 18 and pipe 20 to auxiliary reservoir 49 and also retaining the pressure in the brake cylinder 50, by closing ports 31, 37, 42, 36, 30. A still further reduction will be produced by a repetition of these movements, until, by a total recharge of pipe 6 and a consequent reduction of brake cylinder pressure a full release is accomplished. Meantime the auxiliary reservoir 49 is being recharged from main reservoir 48 as seen in Figs. 14, 15, 16.

I claim—

1. In a brake valve, a case having a chamber in communication with a train pipe, and a piston therein; a chamber in communication with an auxiliary reservoir; a seat therein having ports coinciding with connections to a main reservoir, a brake cylinder and the atmosphere; a valve mounted upon and guided thereby for reciprocating movement, ports therethrough, and a connection from the valve to the piston and whereby the valve is operative by pneumatic pressure.

2. In a brake valve, a case having a chamber in communication with a train pipe, and a piston having a diaphragm therein; a second chamber separated from the first named chamber by the piston and diaphragm; a connection from the second chamber to an auxiliary reservoir; a seat in the chamber, ports therethrough coinciding with connections in the case to a main reservoir, a brake cylinder, and the atmosphere, and a piston controlled valve on the seat; a diaphragm controlled valve mounted on the piston controlled valve; a port therethrough to the chamber, and a port therein connecting with the ports in the piston controlled valve.

3. The combination of an engineer's valve and a train pipe; a main reservoir and a reservoir pipe; an auxiliary reservoir; a brake cylinder; a valve case and connections to the main reservoir, the auxiliary reservoir and the brake cylinder; of a piston and a diaphragm operative by pneumatic pressure, a valve controlled by the piston, a valve controlled by the diaphragm, and whereby in a graduated application the piston and the diaphragm owing to a moderate reduction of the pressure in the train pipe and the piston chamber to less than in the valve chamber move to cause their valves to open a passage from the auxiliary reservoir to the brake cylinder, causing a reduction of pressure in the valve chamber and thereby automatically moving the diaphragm and its valve to close the passage to the brake cylinder.

4. The combination of an engineer's valve and a train pipe; a main reservoir and a reservoir pipe; an auxiliary reservoir; a brake cylinder; a valve case and connections to the main reservoir, the auxiliary reservoir and the brake cylinder; of a piston and a diaphragm operative by pneumatic pressure, a valve controlled by the piston, a valve controlled by the diaphragm, and whereby in an emergency application, by a sudden reduction of pressure in the train pipe and the piston chamber, the excess of pressure in the valve chamber will force the piston and diaphragm to move their valves to full communication from the auxiliary reservoir to the brake cylinder.

5. The combination of an engineer's valve and a train pipe; a main reservoir and a reservoir pipe; an auxiliary reservoir; a brake cylinder; a valve case and connections to the main reservoir, the auxiliary reservoir and the brake cylinder; of a piston and a diaphragm operative by pneumatic pressure, a valve controlled by the piston, a valve controlled by the diaphragm, whereby a graduated release is made by the recharging of the train pipe and the introduction of sufficient pressure to move the piston and diaphragm and their valves to open communication from the brake cylinder to the atmosphere, and the communication between the main and auxiliary reservoirs, which will create a pressure in the valve chamber to move the diaphragm and its valve to cut off communication between the brake cylinder and the atmosphere, and also between the reservoirs.

6. The combination of an engineer's valve and a train pipe; a main reservoir and a reservoir pipe; an auxiliary reservoir; a brake cylinder; a valve case and connections to the main reservoir, the auxiliary reservoir and the brake cylinder; of a piston and a diaphragm operative by pneumatic pressure, a valve controlled by the piston, a valve controlled by the diaphragm, whereby a full release is made by the full charge of train pipe and piston and diaphragm and their valves are forced to a position to open communication from the brake cylinder to the atmosphere, and from the main reservoir and the auxiliary reservoir, causing an immediate discharge of the brake cylinder and the recharging of the reservoir.

In testimony whereof I affix my signature, in presence of two witnesses.

WILLIAM K. RANKIN.

Witnesses:
RANSOM C. WRIGHT,
LEWIS H. REDNER.